(12) United States Patent
Tomino

(10) Patent No.: US 9,031,966 B2
(45) Date of Patent: May 12, 2015

(54) DOCUMENT EDITING DEVICE AND DOCUMENT EDITING METHOD

(75) Inventor: Takenori Tomino, Tokohama (JP)

(73) Assignee: Kyocera Corporation, Kyoto (JP)

( * ) Notice: Subject to any disclaimer, the term of this patent is extended or adjusted under 35 U.S.C. 154(b) by 349 days.

(21) Appl. No.: 12/810,496

(22) PCT Filed: Dec. 24, 2008

(86) PCT No.: PCT/JP2008/073395
§ 371 (c)(1),
(2), (4) Date: Sep. 28, 2010

(87) PCT Pub. No.: WO2009/081926
PCT Pub. Date: Jul. 2, 2009

(65) Prior Publication Data
US 2011/0004605 A1    Jan. 6, 2011

(30) Foreign Application Priority Data

Dec. 25, 2007  (JP) .............................. P 2007-332588

(51) Int. Cl.
| G06F 17/30 | (2006.01) |
| G06F 7/00 | (2006.01) |
| G06F 17/24 | (2006.01) |
| G06F 17/21 | (2006.01) |

(52) U.S. Cl.
CPC .............. *G06F 17/24* (2013.01); *G06F 17/214* (2013.01)

(58) Field of Classification Search
CPC ..................... G06F 17/30253; G06F 17/30985
USPC ....................................................... 707/758
See application file for complete search history.

(56) References Cited

U.S. PATENT DOCUMENTS

| 5,479,383 A * | 12/1995 | Tsuneyoshi ..................... 369/14 |
| 5,854,860 A * | 12/1998 | Kobayashi .................... 382/305 |
| 5,903,904 A * | 5/1999 | Peairs ........................... 715/209 |
| 6,009,424 A * | 12/1999 | Lepage et al. ......... 707/999.005 |
| 6,097,841 A * | 8/2000 | Gunji et al. ................... 382/229 |
| 6,131,092 A * | 10/2000 | Masand ................ 707/999.003 |
| 6,272,242 B1 * | 8/2001 | Saitoh et al. .................. 382/187 |
| 6,353,840 B2 * | 3/2002 | Saito et al. .................... 715/202 |
| 6,643,641 B1 * | 11/2003 | Snyder ......................... 707/709 |
| 7,130,487 B1 * | 10/2006 | Imagawa et al. .............. 382/280 |
| 2002/0154817 A1 * | 10/2002 | Katsuyama et al. .......... 382/190 |
| 2004/0268256 A1 * | 12/2004 | Furuta et al. .................. 715/531 |

(Continued)

FOREIGN PATENT DOCUMENTS

| JP | 06-259458 | 9/1994 |
| JP | 06-290175 | 10/1994 |

(Continued)

OTHER PUBLICATIONS

Toshiba Personal Wapuro Rupo JW05H Rupo Guide, B2 edition, Toshiba Corp., Jun. 25, 1993, pp. 451, 460.

(Continued)

*Primary Examiner* — Pavan Mamillapalli
(74) *Attorney, Agent, or Firm* — Duane Morris LLP

(57) ABSTRACT

A document editing device can edit a document using a markup language, and includes: an operation module for receiving input from a user; a display module that displays an editing screen for editing the document; a control module that searches a character string of a document displayed on the document editing screen, the character string being a character string to which a character decoration type identical to a search-target character decoration type specified by an operation of the operation module by the user is set.

14 Claims, 9 Drawing Sheets

(56) References Cited

U.S. PATENT DOCUMENTS

2007/0195349 A1* 8/2007 Noda .................... 358/1.11
2008/0306916 A1* 12/2008 Gonzalez et al. ............ 707/3

FOREIGN PATENT DOCUMENTS

| JP | 09-006568 | 1/1997 |
| JP | 10-097532 | 4/1998 |
| JP | 2007-150651 | 6/2007 |

OTHER PUBLICATIONS

International Search Report for PCT/JP2008/073395, mailed on Mar. 17, 2009, 3 pages.

Notice of Reasons for Rejection (translation) for JP 2007-332588, mailed Apr. 3, 2012, 6 pages.

Decision of Rejection, and English translation, for JP 2007-332588, mailed Jul. 3, 2012, 4 pages.

* cited by examiner

DOCUMENT EDITING DEVICE AND DOCUMENT EDITING METHOD

CROSS-REFERENCE TO RELATED APPLICATIONS

This is a U.S. National Phase Application of International Application No. PCT/JP2008/073395 filed Dec. 24, 2008, which claims priority to Japanese Patent Application No. 2007-332588 filed Dec. 25, 2007, the disclosures of which are incorporated herein by reference in their entirety.

TECHNICAL FIELD

The present invention relates to a document editing device and a document editing method.

BACKGROUND ART

As is known, web sites (such as home pages or weblogs) that can be browsed on the Internet are generated using a markup language, such as HTML (Hyper Text Markup Language). As long as a device with a web browser is connected to the Internet, anyone can browse web sites without spatial and temporal constraints.

Recently, HTML files called templates, in which the format of screen structures of web sites (such as documents, symbols, drawings, inset pictures that will be used, arrangement positions, character decoration types, background images thereof) is described, have been used so that even beginners unfamiliar with HTML can create web sites. Such templates are used for generating HTML e-mail as well as web sites, and enables easy generation of e-mail, to which various character decoration types are set, and transmission of the e-mail to a destination side.

Patent Document 1: Japanese Unexamined Patent Application, First Publication No. H06-259458
Patent Document 2: Japanese Unexamined Patent Application, First Publication No. H09-6568

DISCLOSURE OF THE INVENTION

Problems to be Solved by the Invention

Regarding HTML documents, such as HTML e-mail, various character decoration types (such as a font color, a font size, blinking, a telop, swinging, character positions (left alignment, center alignment, right alignment)) can be specified as explained above. A document of such an HTML e-mail is displayed on an e-mail browsing screen with character decoration types being reflected. A character decoration type set to each character string is displayed on an e-mail editing screen by using, for example, an icon.

When an HTML e-mail as explained above is transmitted and received between different models of mobile terminals, character decoration types available to one terminal are not available to another terminal in some cases. In this case, a user on a transmitting side has to manually search, on an e-mail editing screen of a user terminal, for character strings to which character decoration types unavailable on a receiving side are set, and convert the character decoration types. However, a manual search for character decoration types is not perfect and time consuming, thereby causing heavy burden on a user.

The present invention is made in consideration of the above situations. An object of the present invention is to reduce the burden on a user to search for character decoration types when character decoration types of a document, which has been edited using a markup language, are converted.

Means for Solving the Problems

A document editing device according to an embodiment of the present invention is a document editing device that can edit a document using a markup language. The document editing device includes: an operation means; a display means that displays a document editing screen; and a control means that searches a character string of a document displayed on the document editing screen, the character string being a character string to which a character decoration type identical to a search-target character decoration type specified by an operation of the operation means is set.

Regarding the above document editing device, the control means collectively converts the character decoration type of all character strings, the character strings being determined by the search to be set with the character decoration type identical to the search-target character decoration type, into a conversion character decoration type specified by an operation of the operation means.

Regarding the above document editing device, the control means displays a warning message on the display means if a plurality of character decoration types are set to at least one of the character strings, the character strings being determined by the search to be set with the character decoration type identical to the search-target character decoration type, and a character decoration type that is incompatible with the conversion character decoration type is included in the plurality of character decoration types.

Regarding the above document editing device, the control means individually converts the character decoration type of character strings, the character strings being determined by the search to be set with the character decoration type identical to the search-target character decoration type, into a conversion character decoration type specified by an operation of the operation means.

Regarding the above document editing device, the control means displays a warning message on the display means if a plurality of character decoration types are set to the character strings, the character strings being determined by the search to be set with the character decoration type identical to the search-target character decoration type, and a character decoration type that is incompatible with the conversion character decoration type is included in the plurality of character decoration types.

The above document editing device further includes a conversion-history storing means that stores history information concerning the conversion character decoration type specified. The control means displays, on the display means, a selection screen for selecting a conversion character decoration type from the history information.

The document editing device further includes a search-history storing means that stores history information concerning the search-target character decoration type specified. The control means displays, on the display means, a selection screen for selecting the search-target character decoration type from the history information.

Regarding the above document editing device, if search-target character decoration types are specified by an operation of the operation means with a combination, the control means searches a character string of the document displayed on the document editing screen, the character string being a character string to which character decoration types are set with the combination identical to the character decoration types with the combination specified.

Regarding the above document editing device, the control means controls the display means to change a display type of the character string on the document editing screen, the character string being determined by the search to be set with the character decoration type identical to the search-target character decoration type.

Regarding the above document editing device, the control means displays, on the display means, a confirmation screen if a display of the confirmation screen for the character decoration type currently specified as the search target is ordered by an operation of the operation means.

The document editing device further includes: a communication means; and an unavailable-type storing means that stores, for each communication destination, a character decoration type unavailable to the communication destination. The control means displays, on the display means, the character decoration type unavailable to the communication destination when the communication destination is specified by an operation of the operation means.

Regarding the above document editing device, the control means searches a character string of the document displayed on the document editing screen, the character string being a character string to which a character decoration type identical to the character decoration type unavailable to the communication destination is set, when the communication destination is specified by an operation of the operation means.

A method of editing a document according to another embodiment of the present invention is a method of editing a document using a markup language. The method includes: a step of displaying a document editing screen; a step of specifying a search-target character decoration type of a document displayed on the document editing screen; and searching a character string of the document displayed on the document editing screen, the character string being a character string to which a character decoration type identical to the search-target character decoration type specified is set.

Effects of the Invention

According to the present invention, character strings, to which a character decoration type identical to a search-target character decoration type specified by an operation of the operation means is set, can automatically be searched from the document displayed on the editing screen. In other words, what a user has to do is only to specify the search-target character decoration type by operating the operation means, thereby enabling a reduction in the time required for searching a character decoration type and a reduction in burden on the user.

Figure 1A:
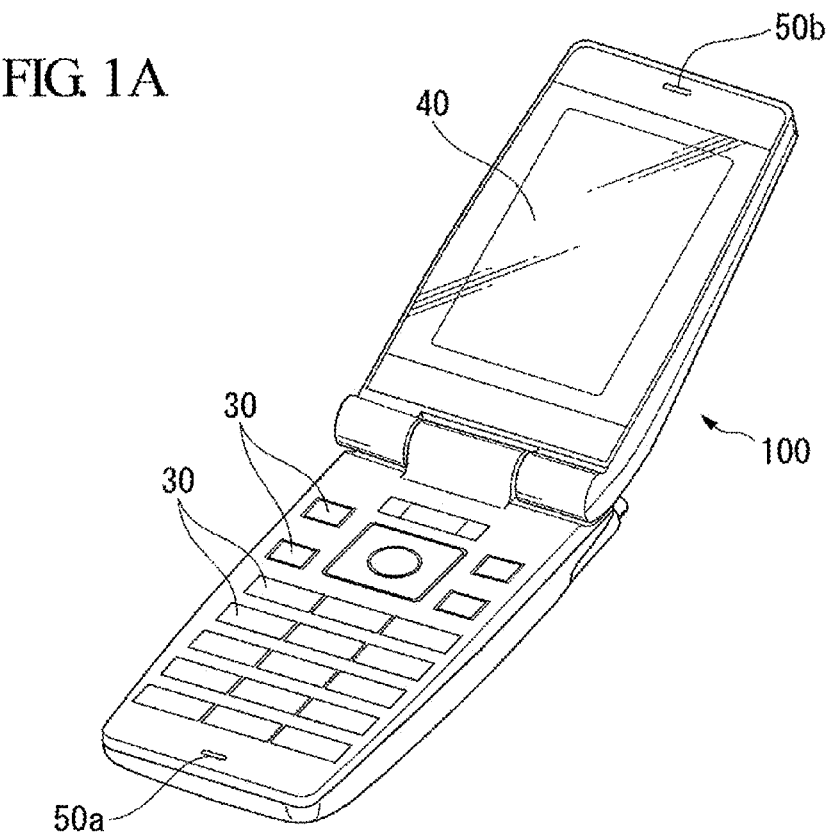
FIG. 1A is an external view illustrating a wireless communication terminal (document editing device) 100 according to an embodiment of the present invention.

DESCRIPTIONS OF REFERENCE NUMERALS 100 wireless communication terminal
10 control unit
20 communication unit
30 operation unit
40 display unit
50 audio input-output unit
60 storing unit

BEST MODE FOR CARRYING OUT THE INVENTION

Hereinafter, an embodiment of the present invention is explained with reference to accompanying drawings. As a document editing device according to the embodiment, a wireless communication terminal, such as a cellular phone, which can edit an HTML e-mail (document) using HTML, is taken as an example for explanation.

Figure 1B:
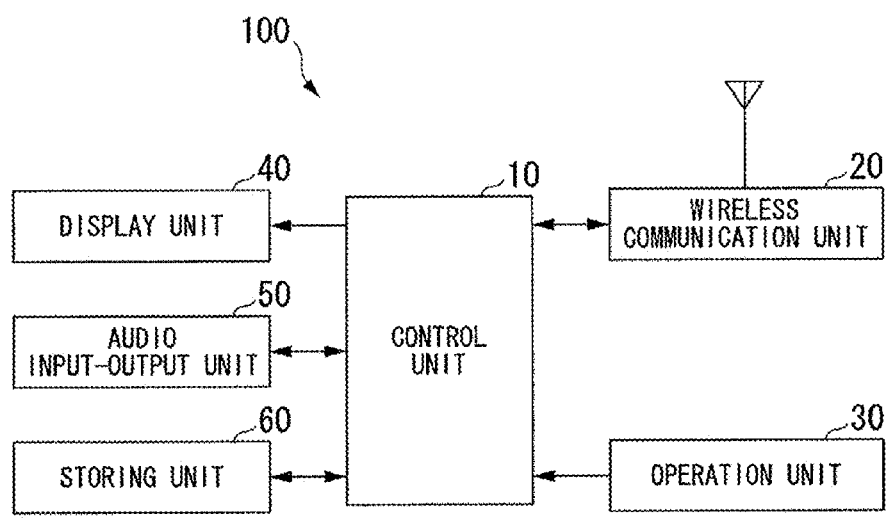
FIG. 1B is a functional block diagram illustrating the wireless communication terminal (document editing device) 100 according to the embodiment of the present invention.

FIG. 1A is an external view illustrating a wireless communication terminal 100 according to the embodiment of the present invention. FIG. 1B is a functional block diagram illustrating the wireless communication terminal 100 according to the embodiment of the present invention. The wireless communication apparatus 100 according to the embodiment includes a control unit 10, a communication unit 20, an operation unit 30, a display unit 40, an audio input-output unit 50, and a storing unit 60.

The control unit 10 is, for example, a baseband processor and controls the entire operation of the wireless communication terminal 100 based on control programs stored in the storing unit 60, reception signals received through the communication unit 20, operation signals received from the operation unit 30, and audio signals received from the audio input-output unit 50. The control unit 10 searches character strings of an HTML e-mail displayed on an e-mail editing screen of the display unit 40, the character strings being character strings to which a character decoration type identical to a search-target character decoration type specified by the operation unit 30 is set. Then, the control unit 10 performs batch conversion or individual conversion of the character decoration type set to the character strings, the character strings being determined by the search to be set with the character decoration type identical to the search-target character decoration type, into the character decoration type specified by the operation unit 30.

Under control of the control unit 10, the communication unit 20 performs error correction coding, modulation, and frequency conversion into an RF (Radio Frequency) band signal on a control signal or a data signal output from the control unit 10, and then transmits a resultant signal to a base station (not shown) as a transmission signal. Additionally, the communication unit 20 performs frequency conversion into an IF (Intermediate Frequency) band signal, demodulation, error correction decoding, and the like on an RF signal received from the base station, and then outputs a resultant signal to the control unit 10 as a reception signal. The operation unit 30 includes operation keys, such as a power key, various function keys, a numeric keypad, and outputs operation signals according to inputs by operations of the operation keys to the control unit 10.

The display unit 40 includes, for example, a liquid crystal display, an organic EL display, and the like, and displays an HTML e-mail editing screen and the like based on a display signal received from the control unit 10. The audio input-output unit 50 includes a microphone 50a and a speaker 50b, converts sound obtained from the outside through the microphone 50a into audio signals, and outputs the audio signals to the control unit 10. Additionally, the audio input-output unit 50 outputs audio signals received from the control unit 10 to the outside through the speaker 50b. The storing unit 60 includes, for example, a flash memory, and stores a control program and various data which are used by the control unit 10.

The wireless communication terminal 100 having the structure explained above can communicate with another wireless communication terminal through a base station. Further, the wireless communication terminal 100 can be connected to the Internet through the base station, and therefore can communicate with fixed terminals, such as various servers and a PC (Personal Computer) which are connected to the Internet.

Hereinafter, operations of the wireless communication terminal 100 according to the embodiment, especially operations of searching and converting character decoration types set to character strings described in an HTML e-mail are explained. There are first and second embodiments for the operations of searching and converting character decoration types. The first embodiment is explained first.

First Embodiment

Figure 2:
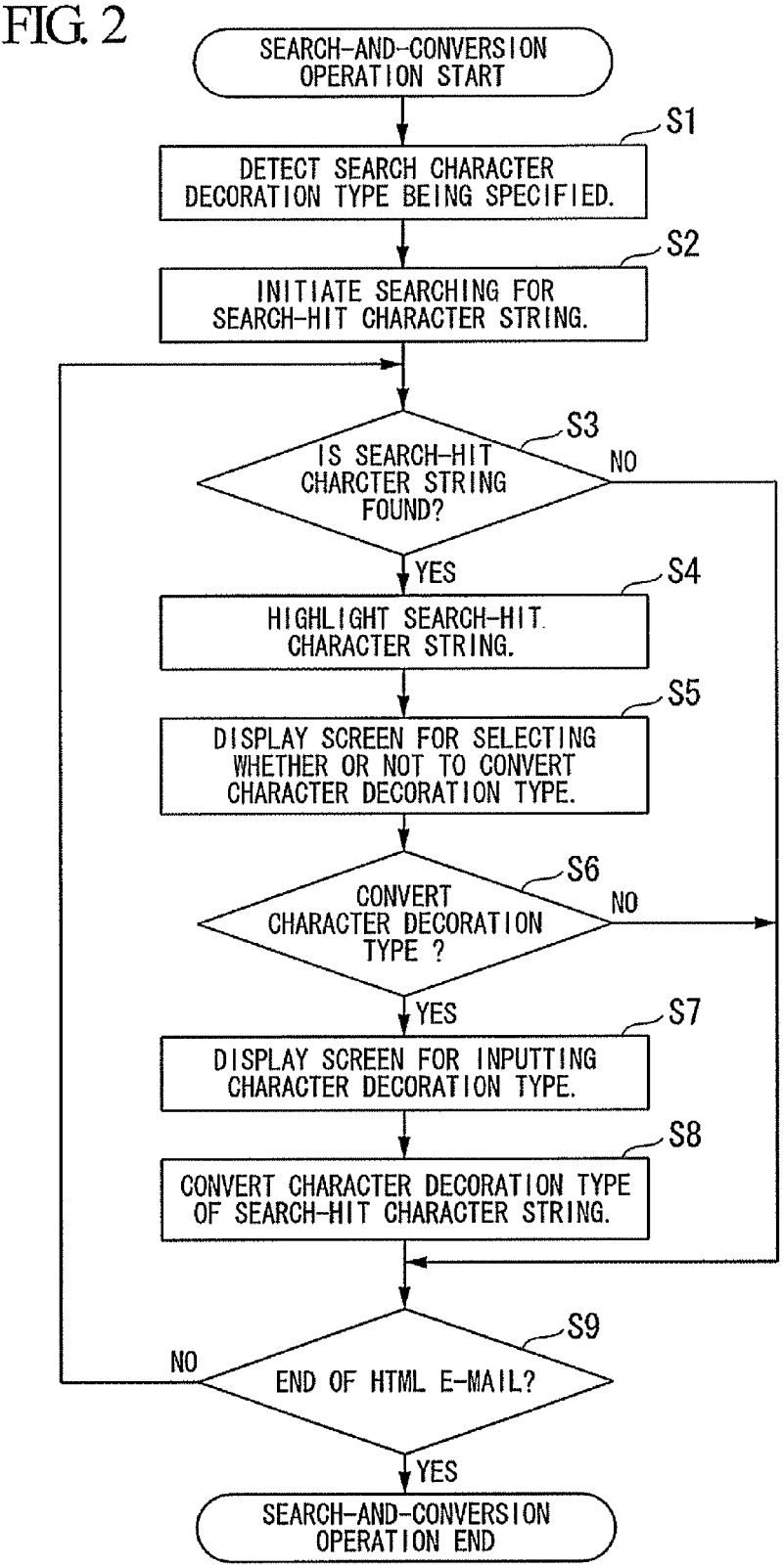
FIG. 2 is a flowchart illustrating operations of the wireless communication terminal 100 according to the embodiment of the present invention.

FIG. 2 is a flowchart illustrating operations of searching and converting character decoration types according to the first embodiment. Firstly, the control unit 10 detects, in an HTML e-mail displayed on the e-mail editing screen, a search-target character decoration type specified by an operation of the operation unit 30 (step S1). Then, the control unit 10 initiates searching a character string of the HTML e-mail displayed on the e-mail editing screen, the character string being a character string to which the character decoration type identical to the search-target character decoration type specified in step S1 is set (step S2). Hereinafter, the search-target character decoration type is called the "search character decoration type." The character string, to which the character decoration type identical to the search-target character decoration type is set, is called a "search-hit character string."

Figure 3:
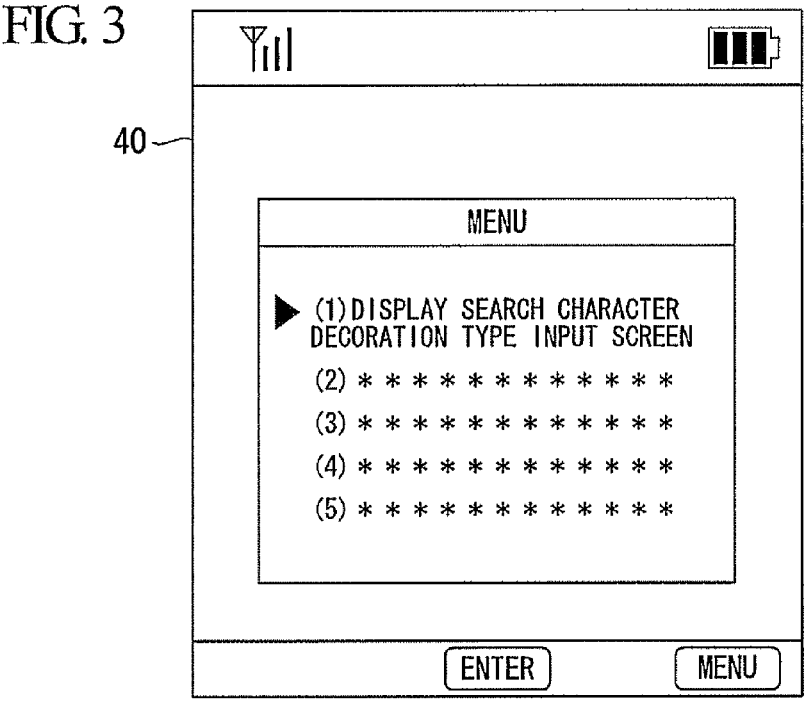
FIG. 3 illustrates an operation of the wireless communication terminal 100 according to the embodiment of the present invention.
Figure 3:
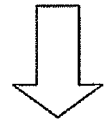
Figure 3:
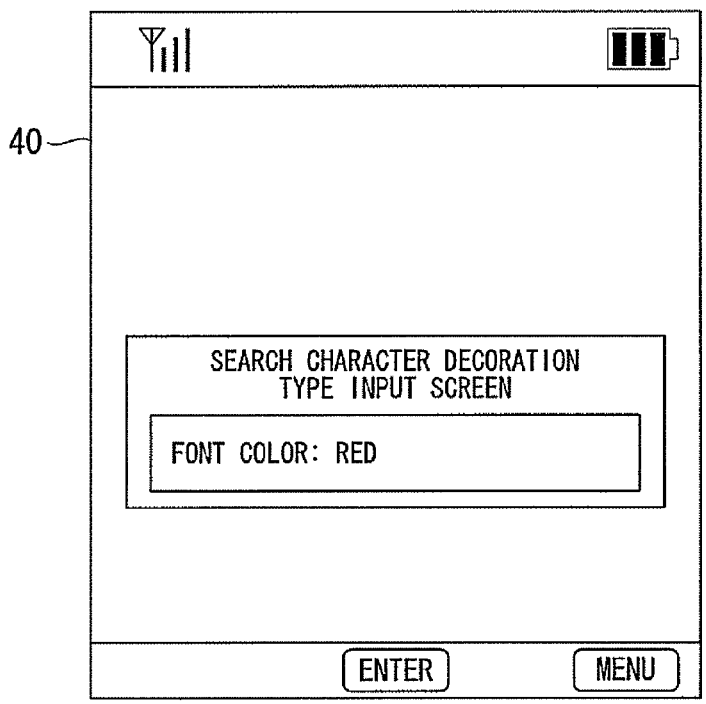
Figure 4:
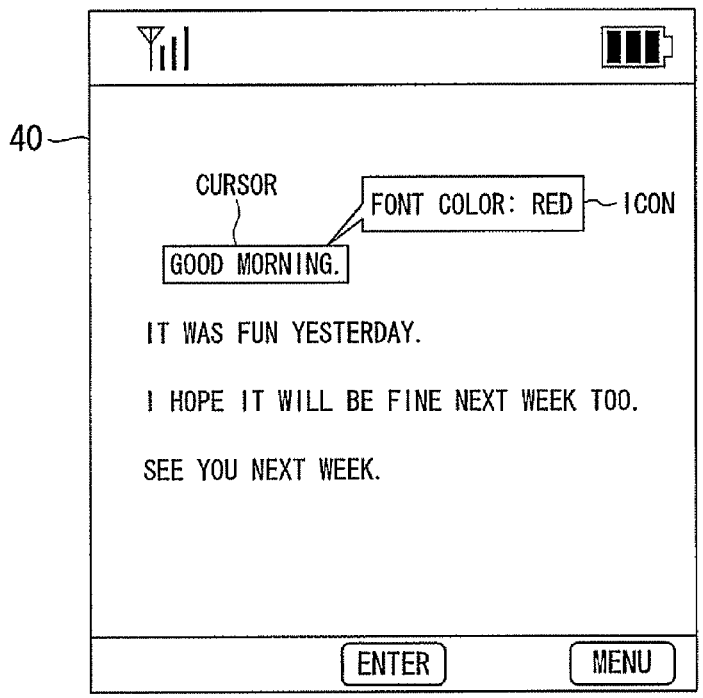
FIG. 4 illustrates an operation of the wireless communication terminal 100 according to the embodiment of the present invention.
Figure 4:
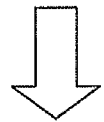
Figure 4:
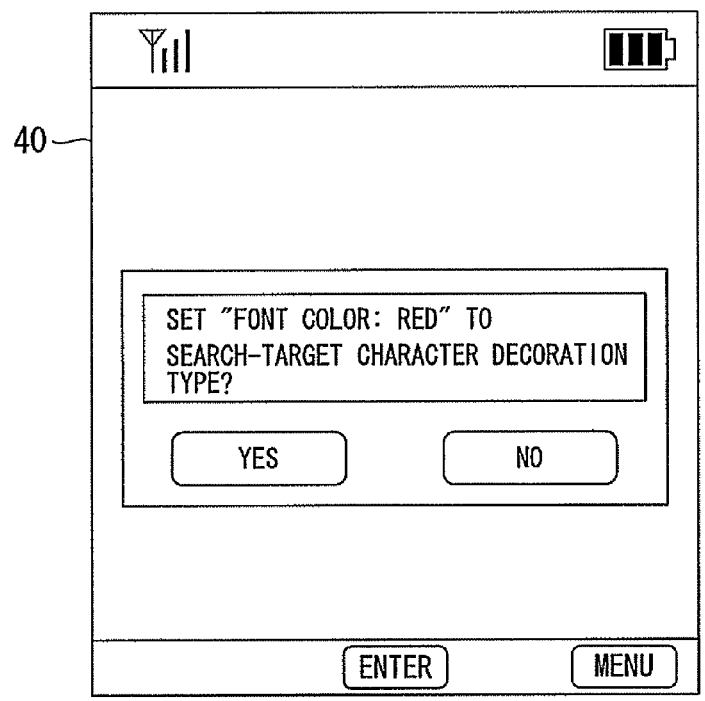

As a method of specifying a search character decoration type, a menu screen may be switched to a search character decoration type input screen on which a search character decoration type can be directly input, as shown in FIG. 3. As another method of specifying a search character decoration type, a character decoration type set to a character string included in an HTML e-mail displayed on the editing screen may be displayed by an icon when a cursor is moved over the character string, as shown in FIG. 4. Then, a selection screen for selecting whether or not to set the character decoration type, which is set to the character string, to a search character decoration type may be displayed when an enter key is pressed at the cursor position. In the case of FIG. 4, "font color: red" that is the character decoration type set to "good morning" is displayed by an icon when the cursor is moved over the character string of "good morning." Then, a selection screen showing "specify font color: red as search character decoration type?" is displayed when the enter key is pressed.

Hereinafter, explanations are given under the assumption that "font color: red" is directly input as a search character decoration type on the input screen shown in FIG. 3.

Figure 5:
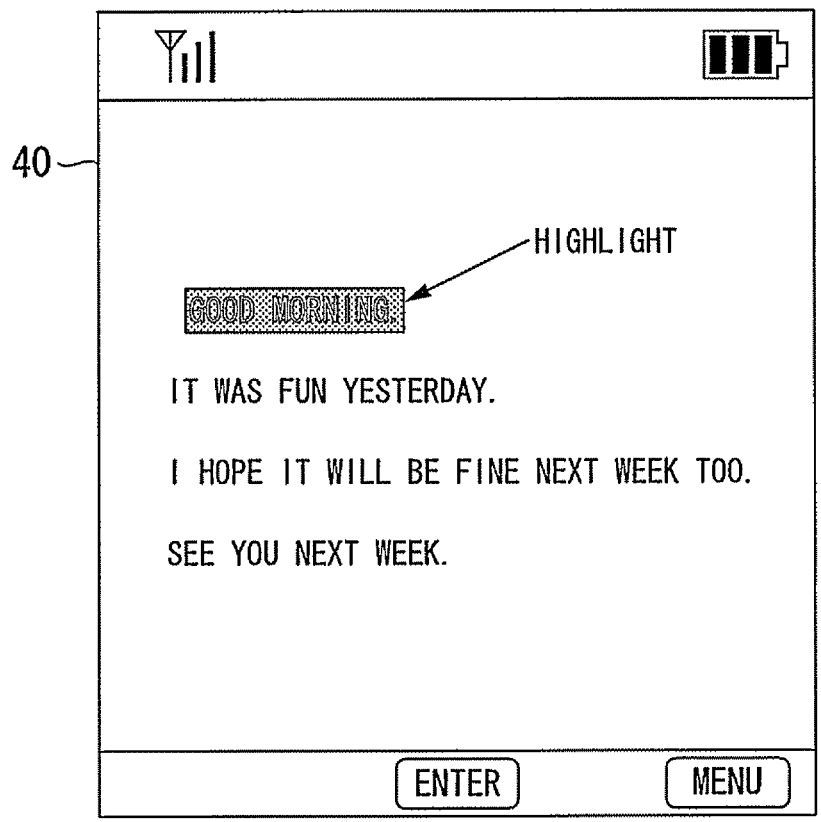
FIG. 5 illustrates an operation of the wireless communication terminal 100 according to the embodiment of the present invention.

As an operation of searching a search-hit character string, the control unit 10 finds a character string, to which a character decoration type is set, sequentially from the beginning of the HMTL e-mail, determines whether or not the character decoration type set to the found character string is identical to the search character decoration type, and thereby determines whether or not the found character string is the search-hit character string (step S3). If it is determined in step S3 that the found character string is the search-hit character string, i.e., that the character decoration type set to the found character string is identical to the search character decoration type (step S3: YES), the control unit 10 changes the display type of the search-hit character string on the e-mail editing screen (step S4). For example, when "good morning" is found as a character string to which a character decoration type is set as shown in FIG. 5, the character string is determined to be the search-hit character string since the character decoration type of "good morning" is "font color: red", and thereby the character string of "good morning" is highlighted. Alternatively, the search-hit character string may be underlined. On the other hand, if it is determined in step S3 that the found character string is not the search-hit character string, i.e., that the character decoration type set to the found character string is not identical to the search character decoration type (step S3: NO), the control unit 10 proceeds to step S9.

Figure 6A:
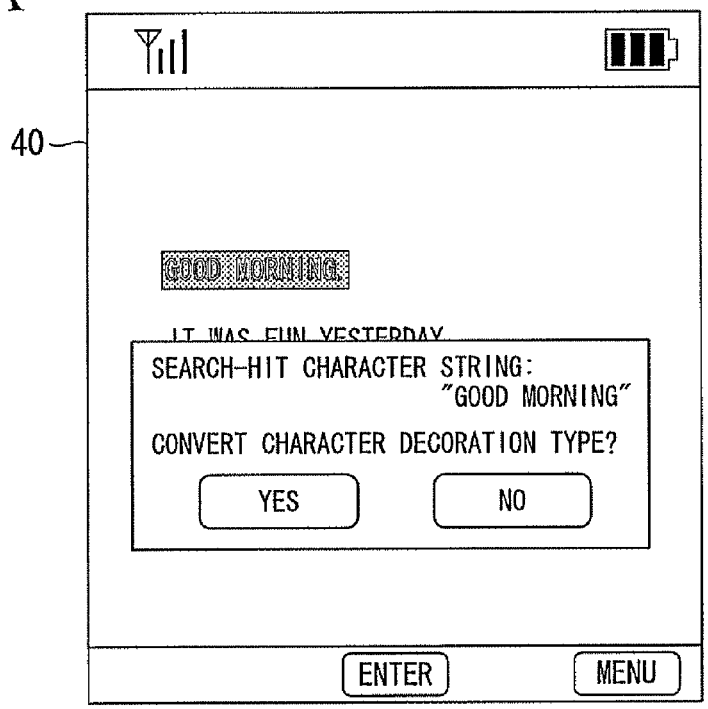
FIG. 6A illustrates an operation of the wireless communication terminal 100 according to another embodiment of the present invention.
Figure 6B:
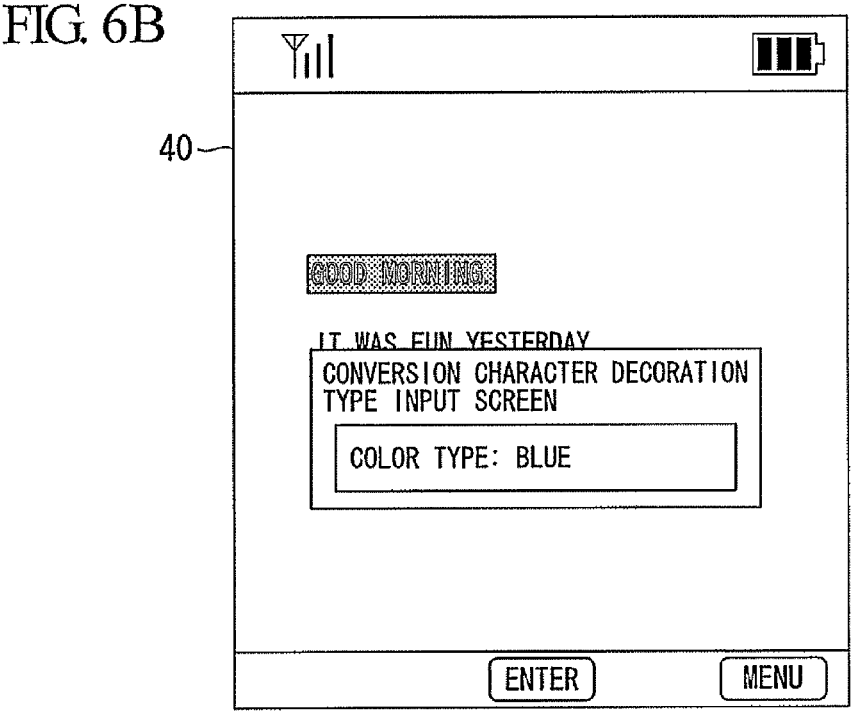
FIG. 6B illustrates an operation of the wireless communication terminal 100 according to the another embodiment of the present invention.

Then, the control unit 10 makes the display unit 40 display, on the e-mail editing screen, a selection screen for selecting whether or not to convert the character decoration type set to the search-hit character string (for example, "good morning"), as shown in FIG. 6A (step S5). Then, the control unit 10 determines whether or not "YES" is selected on the selection screen by an operation of the operation unit 30 (step S6). If "YES" is selected ("YES"), an input screen for specifying a character decoration type for conversion (hereinafter, "conversion character decoration type") is displayed as shown in FIG. 6B (step S7). Then, the control unit 10 converts the character decoration type set to the search-hit character string into the conversion character decoration type input on the input screen by an operation of the operation unit 30 (step S8). When "font color: blue" is specified as a conversion character decoration type, the character decoration type set to "good morning" is converted from "font color: red" into "font color: blue." On the other hand, if "NO" is selected in step S6 ("NO"), the control unit 10 proceeds to step S9.

Then, the control unit 10 determines whether or not the operation of searching and converting search-hit character strings is performed to the end of the document (step S9). If the search-and-conversion operation has been performed to the end of the document (step S9: YES), the control unit 10 terminates the search-and-conversion operation. If the search and conversion operation has not been performed to the end of the document (step S9: NO), the control unit 10 returns to step S3.

As explained above, according to the wireless communication terminal 100 of the first embodiment, a character string (search-hit character string), to which a character decoration type identical to the search character decoration type specified by an operation of the operation unit 30 is set, can automatically be searched from an HTML e-mail displayed on the e-mail editing screen. In other words, a user has only to specify a search character decoration type by operating the operation unit 30 (a conversion character decoration type has to be specified at the time of conversion), thereby enabling a reduction in a time required for searching and converting character decoration types and a reduction in burden on the user.

Second Embodiment

Hereinafter, operations of searching and converting character decoration types according to a second embodiment are explained.

It has been explained in the first embodiment that a search-hit character string is searched from the beginning of an HTML e-mail, and a character decoration type set to the search-hit character string is individually converted each time the search-hit character string is found. On the other hand, batch conversion of character decoration types is performed on all the search-hit character strings.

Figure 7A:
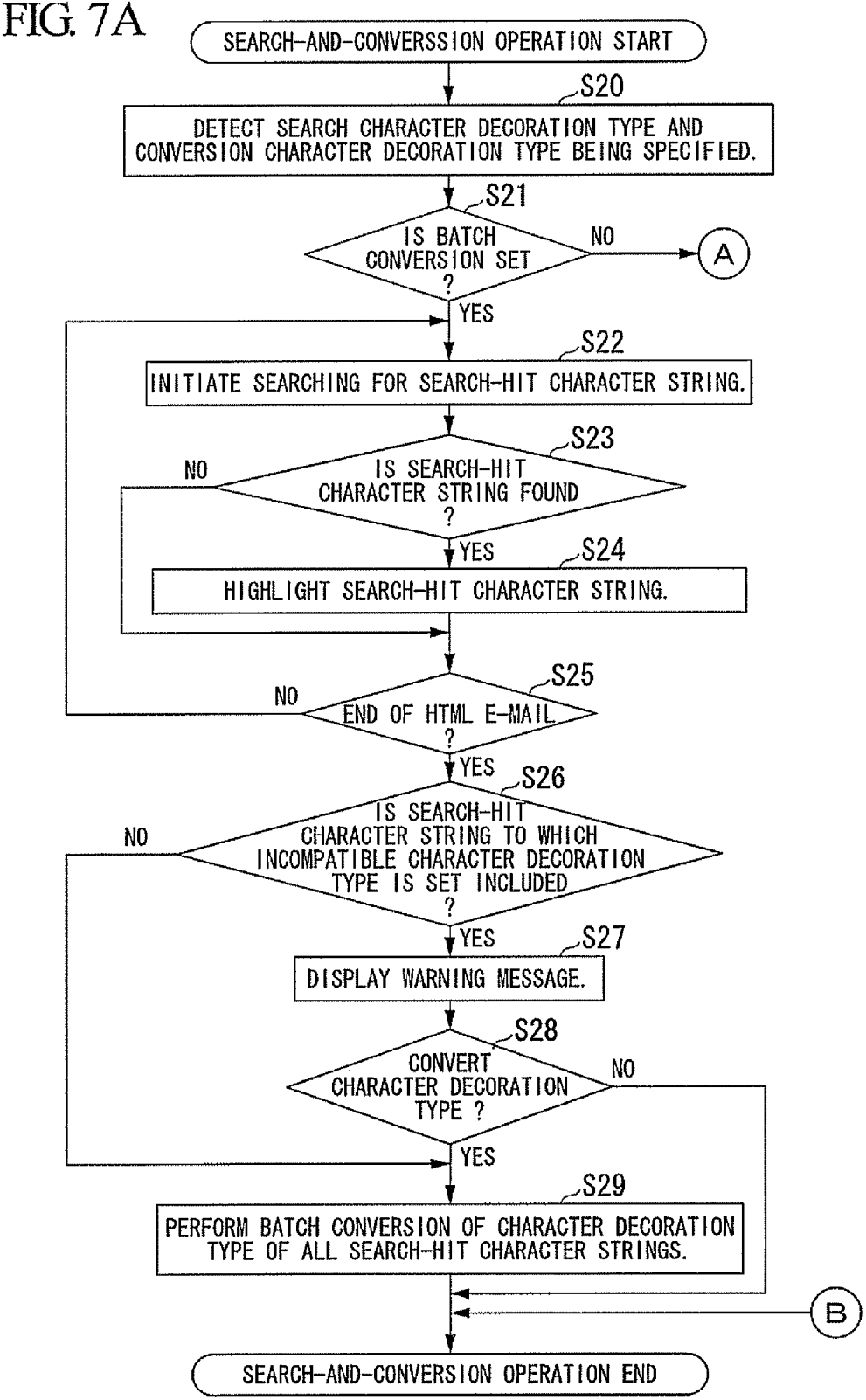
FIG. 7A is a flowchart illustrating operations of the wireless communication terminal 100 according to the another embodiment of the present invention.
Figure 7B:
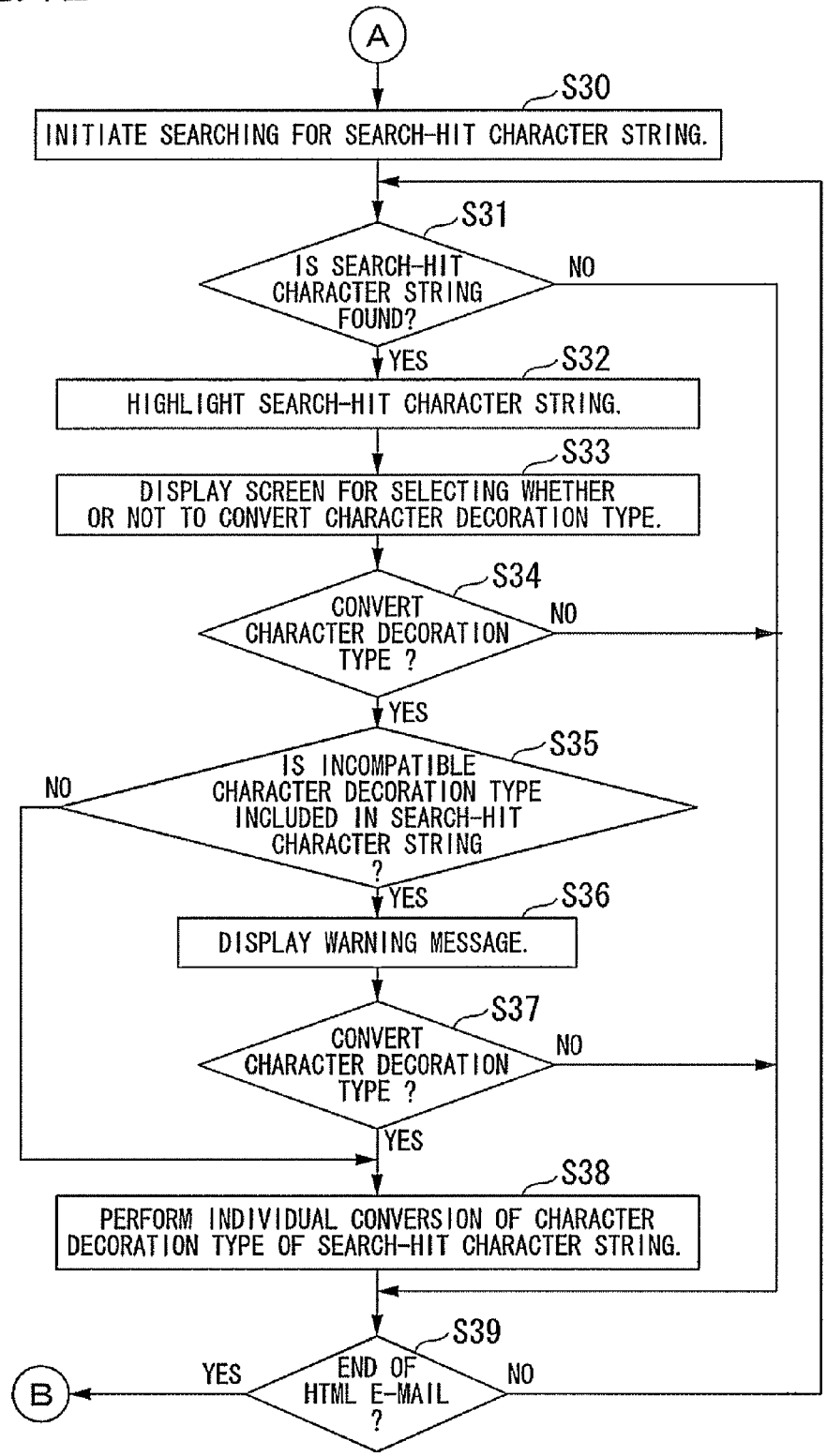
FIG. 7B is a flowchart illustrating operations of the wireless communication terminal 100 according to the another embodiment of the present invention.

FIGS. 7A and 7B are flowcharts illustrating operations of searching and converting character decoration types according to the second embodiment. Firstly, the control unit 10 detects, on an e-mail editing screen, a search character decoration type and a conversion character decoration type which are specified by an operation of the operation unit 30 (step S20). Then, the control unit 10 determines whether or not batch conversion for search-hit character strings is set (step S21). The batch conversion for search-hit character strings may preliminarily be set before an HTML e-mail is edited. Alternatively, a setting screen may be displayed on the e-mail editing screen so that the batch conversion can be set by an operation of the operation unit 30 during an editing. A method of specifying a search character decoration type and a conversion character decoration type, which is similar to that of the first embodiment, may be used.

If the batch conversion for search-hit character strings is set in step S21 (step S21: YES), the control unit 10 initiates searching search-hit character strings of the HTML e-mail displayed on the e-mail editing screen of the display unit 40, the search-hit character strings being search-hit character strings to which a character decoration type identical to the search character decoration type specified in step S20 is set (step S22). As the operation of searching search-hit character strings, the control unit 10 finds a character string to which a character decoration type is set from the beginning of the HTML e-mail. Then, the control unit 10 determines whether or not a character decoration type set to the found character string is identical to the search character decoration type, and thereby determines whether or not the found character string is the search-hit character string (step S23).

If the found character string is determined to be the search-hit character string in step S23, i.e., if the character decoration type set to the found character string is identical to the search character decoration type (step S23: YES), the control unit 10 changes the display type of the search-hit character string on the e-mail editing screen (step S24). For example, the search-hit character string is highlighted similarly to the first embodiment. On the other hand, if the found character string is determined not to be the search-hit character string in step S23, i.e., if the character decoration type set to the found character string is not identical to the search character decoration type (step S23: NO), the control unit 10 proceeds to step S25.

Figure 8A:
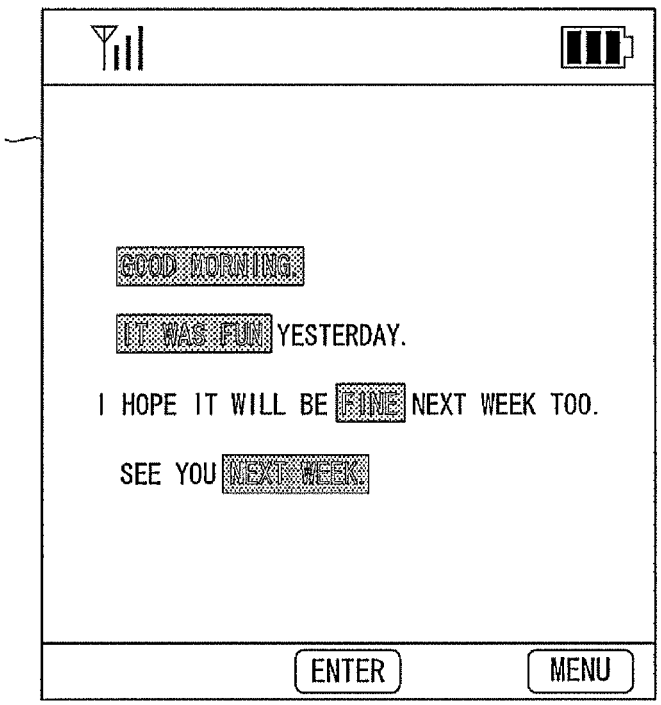
FIG. 8A illustrates an operation of the wireless communication terminal 100 according to the another embodiment of the present invention.

Then, the control unit 10 determines whether or not the operation of searching search-hit character strings is performed to the end of the HTML e-mail (step S25). If the search operation is determined not to have been performed to the end of the HTML e-mail (step S25: NO), the control unit 10 returns to step S23. In other words, the operations from steps S23 to S25 are repeated to the end of the HTML e-mail, and thereby all the search-hit character strings included in the HTML e-mail are highlighted as shown in FIG. 8A.

On the other hand, if the search operation is determined to have been performed to the end of the HTML e-mail in step S25 (step S25: YES), the control unit 10 determines whether or not a character string, to which a character decoration type that is incompatible with the specified conversion character decoration type is set, is included in the found search-hit character strings (step S26). For example, it is assumed here that "blinking" and "centering" are specified as the search character decoration type and the conversion character decoration type, respectively. If two character decoration types of "blinking" and "swinging" are set to a character string A, the character string A is recognized as the search-hit character string. However, if the character decoration type "blinking" set to the character string A is converted into the conversion character decoration type "centering", "centering" is not compatible with another character decoration type "swinging" set to the character string A (since "swinging" indicates moving a character from side to side, and "centering" indicates moving a character to the center position).

Figure 8B:
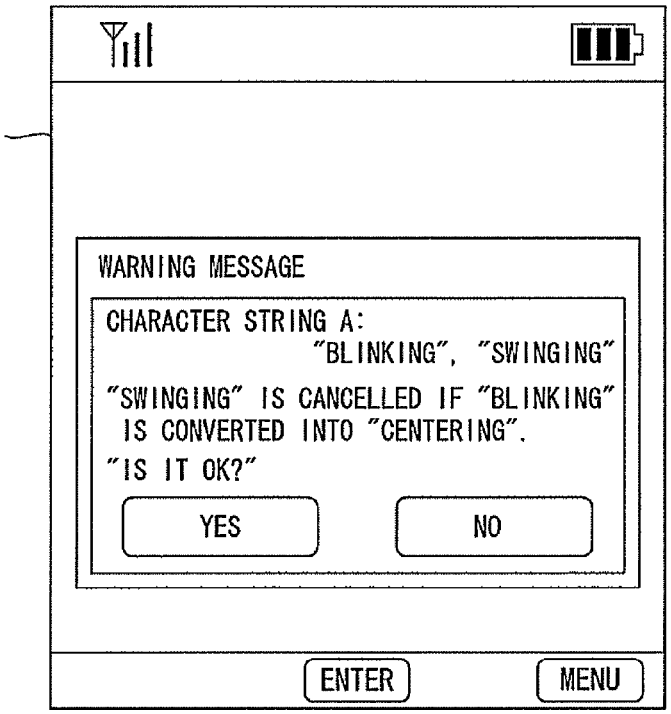
FIG. 8B illustrates an operation of the wireless communication terminal 100 according to the another embodiment of the present invention.

If at least one character string, to which a character decoration type that is incompatible with the conversion character decoration type is set, is included in all the search-hit character strings (step S26: YES), the control unit 10 displays a warning message indicative of the result on the e-mail editing screen (step S27). FIG. 8B illustrates an example of the warning message. As shown in FIG. 8B, the warning message indicates that "swinging" is cancelled if "blinking" set to the character string A is converted into the conversion character decoration type "centering", and then choices whether or not to convert the character decoration type are displayed. If multiple character strings, to which character decoration types that are incompatible with the conversion character decoration type are set, are included, information concerning each character string may be displayed with the warning message.

Then, the control unit 10 determines whether or not "YES" is selected on the screen showing the warning message by an operation of the operation unit 30 (step S28). If "YES" is selected (step S28: YES), character decoration types of all the search-hit character strings (only the character decoration type identical to the search character decoration type if multiple character decoration types are set to one search-hit character string) are batch-converted into the conversion character decoration type (step S29). On the other hand, no character string, to which a character decoration type that is incompatible with the conversion character decoration type is set, is included in all the search-hit character strings (step S26: NO), the control unit 10 proceeds to step S29, and batch-converts character decoration types of all the search-hit character strings into the conversion character decoration type. If "NO"

is selected in step S28 (step S28: NO), the control unit 10 terminates the operation of searching and converting search-hit character strings.

If the batch conversion for search-hit character strings is not set in step S21 (step S21: NO), the control unit 10 initiates searching a search-hit character string to which the search character decoration type specified in step S20 is set (step S30). As the operation of searching a search-hit character string, the control unit 10 finds a character string, to which a character decoration type is set, sequentially from the beginning of the HTML e-mail. Then, the control unit 10 determines whether or not a character decoration type set to the found character string is identical to the search character decoration type, and thereby determines whether or not the found character string is the search-hit character string (step S31).

If the found character string is determined to be the search-hit character string in step S31, i.e., if the character decoration type set to the found character string is identical to the search character decoration type (step S31: YES), the control unit 10 changes the display type of the search-hit character string on the e-mail editing screen (step S32). On the other hand, if the found character string is determined not to be the search-hit character string in step S31, i.e., if the character decoration type set to the found character string is not identical to the search character decoration type (step S31: NO), the control unit 10 proceeds to step S39.

Then, the control unit 10 makes the display unit 40 display, on the e-mail editing screen, a selection screen for selecting whether or not to convert the character decoration type set to the search-hit character string (step S33). The selection screen to be displayed here is similar to that displayed in step S5 of the first embodiment. Then, the control unit 10 determines whether or not "YES" is selected on the selection screen by an operation of the operation unit 30 (step S34). If it is determined that "NO" is selected (step S34: NO), the control unit 10 proceeds to step S39.

On the other hand, if it is determined that "YES" is selected in step S34 (step S34: YES), the control unit 10 determines whether or not a character decoration type that is incompatible with the conversion character decoration type is included in the character decoration types set to the search-hit character string (step S35). If a character decoration type that is incompatible with the conversion character decoration type is included in the character decoration types set to the search-hit character string (step S35: YES), the control unit 10 displays a warning message indicative of the result on the editing screen (step S36). The warning message is similar to that in step S27.

Then, the control unit 10 determines whether or not "YES" is selected on the screen showing the warning message by an operation of the operation unit 30 (step S37). If "YES" is selected (step S37: YES), the control unit 10 individually converts the character decoration type set to the search-hit character string (only the character decoration type identical to the search character decoration type if multiple character decoration types are set to the search-hit character string) into the conversion character decoration type (individual conversion) (step S38). On the other hand, if a character decoration type that is incompatible with the conversion character decoration type is not included in the character decoration types set to the search-hit character string (step S35: NO), the control unit 10 proceeds to step S38 and converts the character decoration type set to the search-hit character string into the conversion character decoration type. If "NO" is selected in step S37 (step S37: NO), the control unit 10 proceeds to step S39.

Then, the control unit 10 determines whether or not the operation of searching and converting search-hit character strings has been performed to the end of the HTML e-mail (step S39). If the search and conversion operation has been performed to the end of the HTML e-mail (step S39: YES), the control unit 10 terminates the search and conversion operation. If the search and conversion operation has not been performed to the end of the HTML e-mail (step S39: NO), the control unit 10 returns to step S31.

As explained above, batch conversion of character decoration types can be performed on all the search-hit character strings in the second embodiment. Therefore, a time required for searching and converting character decoration types and burden on a user can further be reduced compared to the first embodiment. Additionally, a warning message is displayed to urge user to make a decision if a character decoration type that is incompatible with the conversion character decoration type is included in character decoration types set to the search-hit character string. Thereby, conversion of character decoration types which reflects user intension of editing as much as possible can be performed.

The present invention is not limited to the embodiments explained above, and following modifications can be considered.

(1) When a search character decoration type and a conversion character decoration type are specified in the above embodiments, the menu screen is switched to the search character decoration type input screen as shown in FIG. 3. Then, a search character decoration type is directly input on the input screen. Alternatively, as shown in FIG. 4, when a cursor is moved over a character string included in an HTML e-mail displayed on the e-mail editing screen, and then the enter key is pressed, the selection screen for selecting whether or not to set the character decoration type of the character string to the search character decoration type is displayed. Alternatively, the control unit 10 may have a function of making the storing unit 60 store history information concerning search character decoration types so that the control unit 10 displays, on the e-mail editing screen, a selection screen for selecting a search character decoration type from the history information. Alternatively, the control unit 10 may have a function of making the storing unit 60 store history information concerning conversion character decoration types so that the control unit 10 displays on the e-mail editing screen, a selection screen for selecting a conversion character decoration type from the history information.

(2) It is explained in the above embodiments that a search character decoration type is specified one by one. Alternatively, the control unit 10 may have a function of searching, if search character decoration types are specified with a combination by an operation of the operation unit 30, a character string to which search character decoration types with a combination identical to the search character decoration types with specified combination is set.

(3) The control unit 10 may have a function of displaying, on the mail editing screen of the display unit 40, a confirmation screen if a display of the confirmation screen for the character decoration type currently specified as the search target is requested by an operation of the operation unit 30. Thereby, a user can quickly confirm the currently-specified character decoration type even when the user forgets the search character decoration type.

(4) The control unit 10 may have a function of making the storing unit 60 store character decoration types unavailable to a communication destination for each communication destination (i.e., each transmission address of an HTML e-mail). Then, the control unit 10 may display, on the display unit 40, the character decoration type unavailable to a communication destination when the communication destination is specified by an operation of the operation unit 30 (i.e., when a transmission address of an HTML e-mail is specified). Further, the control unit 10 may have a function of automatically searching a character string of an HTML e-mail displayed on the e-mail editing screen, the character string being a character string to which a character decoration type identical to the character decoration type unavailable to the communication destination is set. Thereby, a user does not have to specify a search character decoration type, thereby enhancing conveniences.

(5) In the above embodiments, the wireless communication terminal 100 that can edit an HTML e-mail, such as a cellular phone, has been taken as an example of a document editing device for explanation. However, the present invention is not limited thereto, and is applicable to any document editing device that can edit a document using a markup language. For example, XML, XHTML, and the like may be used as a markup language, and the document is not limited to e-mail.

(6) Further, the present invention is applicable to a document editing device that can edit a document in which characters that are not limited to the markup language can be decorated.

INDUSTRIAL APPLICABILITY

The present invention is applicable to a document editing device that can edit a document using a markup language.

The invention claimed is:

1. A document editing device comprising:
an operation module that receives a character decoration type as a search-target from a user;
a display module that displays an editing document which contains character strings; and
a control module that searches a character string of the editing document for a character decoration type of the searched character string that is identical to the search-target.

2. The document editing device according to claim 1, wherein the control module collectively converts the character decoration type of all character strings, the character strings being determined by the search to be set with the character decoration type identical to the search-target, into a conversion character decoration type specified by an operation of the operation module by the user.

3. The document editing device according to claim 2, wherein the control module displays a warning message on the display module if a plurality of character decoration types are set to at least one of the character strings, the character strings being determined by the search to be set with the character decoration type identical to the search-target, and a character decoration type that is incompatible with the conversion character decoration type is included in the plurality of character decoration types.

4. The document editing device according to claim 1, wherein the control module individually converts the character decoration type of character strings, the character strings being determined by the search to be set with the character decoration type identical to the search-target, into a conversion character decoration type specified by an operation of the operation module by the user.

5. The document editing device according to claim 4, wherein the control module displays a warning message on the display module if a plurality of character decoration types are set to the character strings, the character strings being determined by the search to be set with the character decoration type identical to the search-target, and a character decoration type that is incompatible with the conversion character decoration type is included in the plurality of character decoration types.

6. The document editing device according to claim 2, further comprising:
a conversion-history storing module that stores history information concerning the conversion character decoration type specified,
wherein the control module displays, on the display module, a selection screen for selecting a conversion character decoration type from the history information.

7. The document editing device according to claim 1, further comprising:
a search-history storing module that stores history information concerning the search-target character,
wherein the control module displays, on the display module, a selection screen for selecting the search-target character decoration type from the history information.

8. The document editing device according to claim 1, wherein if search-targets are specified by an operation of the operation module by the user with a combination, the control module searches a character string of the editing document, the character string being a character string to which character decoration types are set with the combination identical to the character decoration types with the combination specified.

9. The document editing device according to claim 1, wherein the control module controls the display module to change a display type of the character string determined by the search to be set with the character decoration type identical to the search-target character decoration type.

10. The document editing device according to claim 1, wherein the control module displays, on the display module, a confirmation screen if a display of the confirmation screen for the character decoration type currently specified as the search target is ordered by an operation of the operation module by the user.

11. The document editing device according to claim 1, further comprising:
a communication module; and
an unavailable-type storing module that stores, for each communication destination, a character decoration type unavailable to the communication destination,
wherein the control module displays, on the display module, the character decoration type unavailable to the communication destination when the communication destination is specified by an operation of the operation module by the user.

12. The document editing device according to claim 11, wherein the control module searches a character string of the editing document, the character string being a character string to which a character decoration type identical to the character decoration type unavailable to the communication destination is set, when the communication destination is specified by an operation of the operation module by the user.

13. The document editing device according to claim 1, wherein the control module sets, to the search-target, a character decoration type of a character string specified in the editing document, by an operation of the operation module by the user.

14. A method of editing a document, comprising:
displaying an editing document which contains character strings;
receiving a character decoration type as a search-target from a user; and
searching a character string of the editing document for a character decoration type identical to the search-target.

* * * * *